Nov. 5, 1963  W. B. WELSH  3,109,923
ELECTRONIC BUSINESS ACCOUNTING MACHINE
Filed Nov. 21, 1960  3 Sheets-Sheet 1

INVENTOR.
WILLIAM BRADLEY WELSH
BY
ATTORNEYS

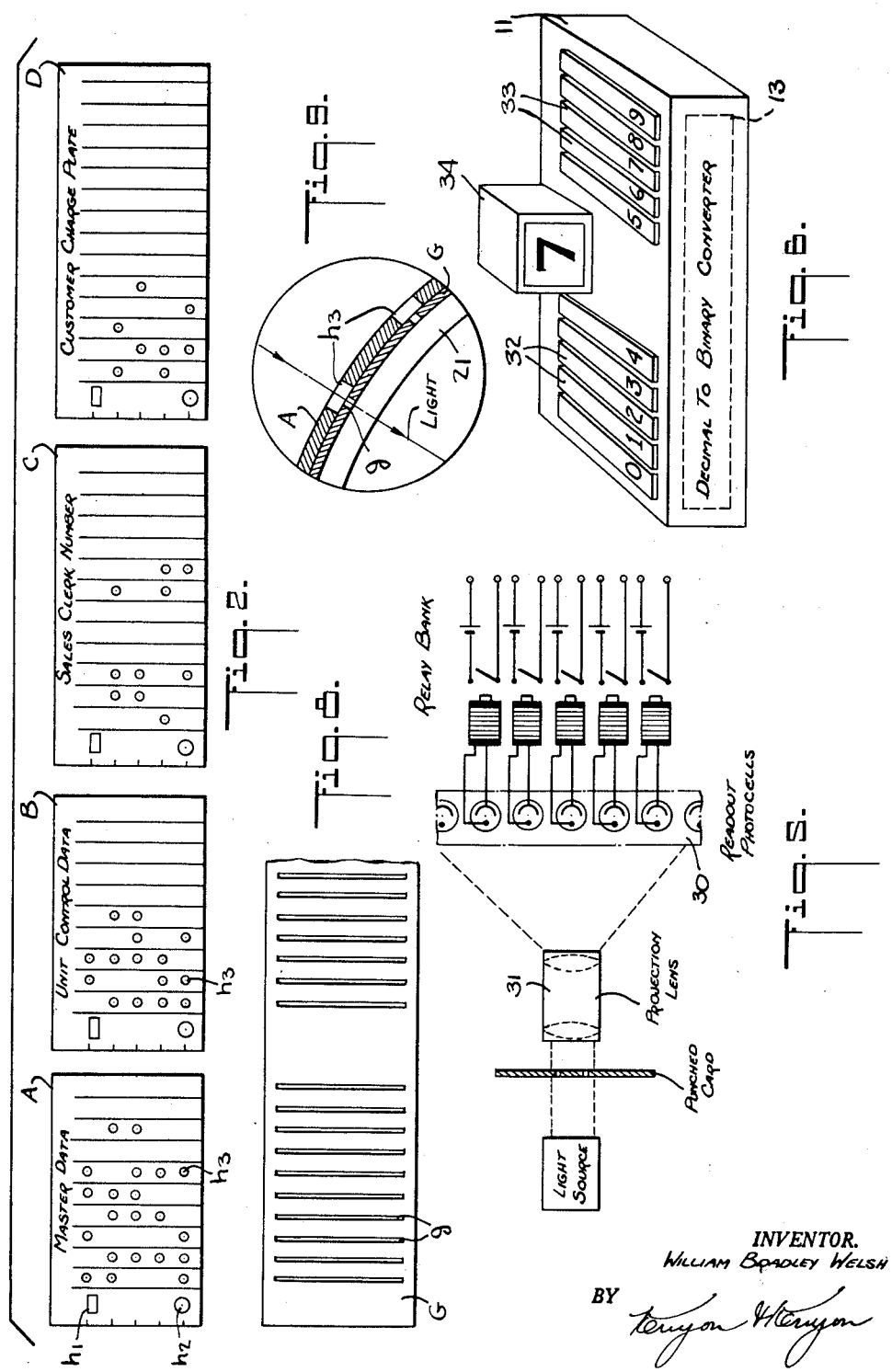

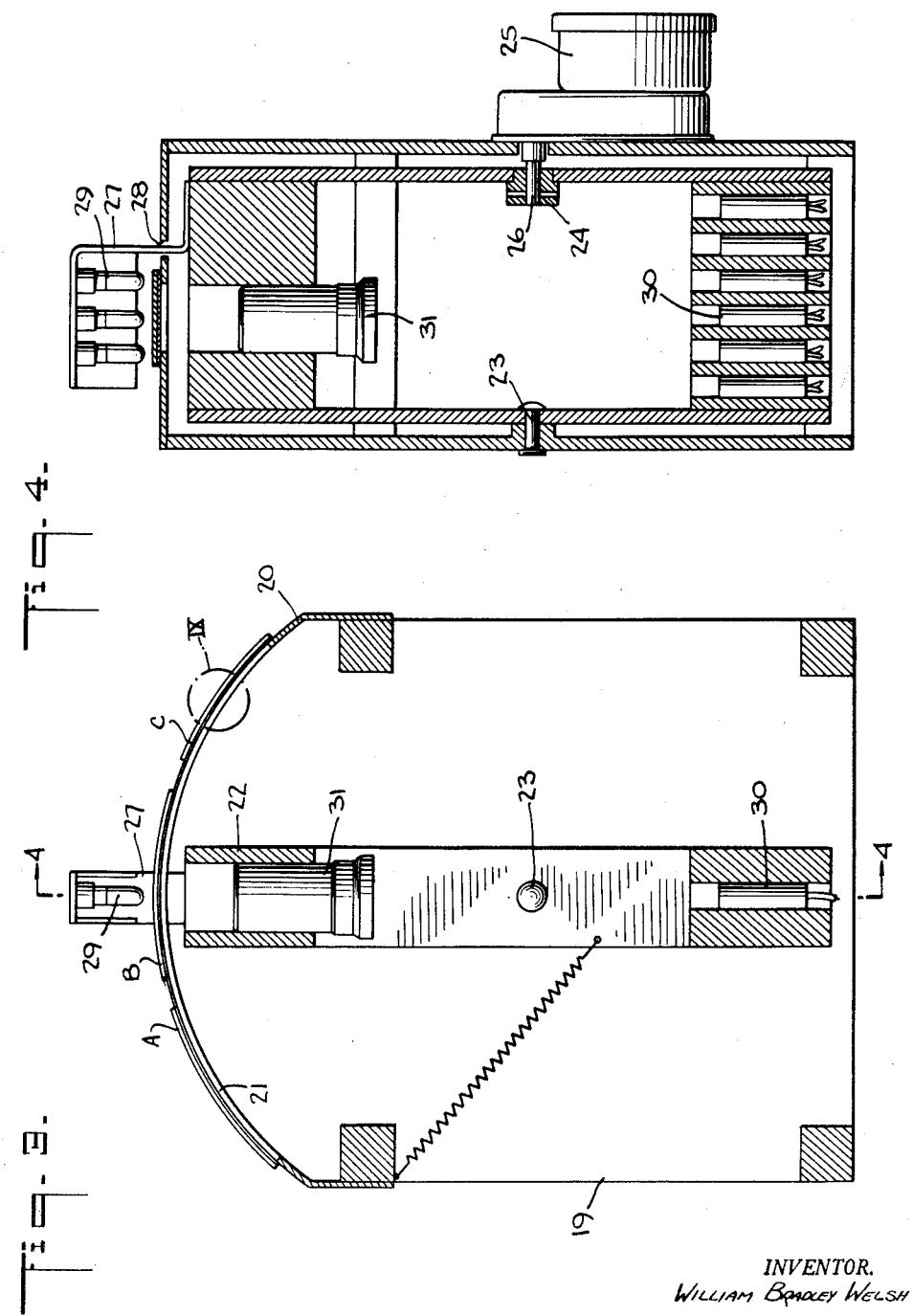

United States Patent Office 3,109,923
Patented Nov. 5, 1963

3,109,923
ELECTRONIC BUSINESS ACCOUNTING MACHINE
William Bradley Welsh, New York, N.Y., assignor, by mesne assignments, to Key Data Machines Corporation, New York, N.Y., a corporation of Delaware
Filed Nov. 21, 1960, Ser. No. 70,610
5 Claims. (Cl. 235—61.11)

The present invention relates generally to electronic business accounting systems and more particularly to improved apparatus adapted to carry out auditing operations in retail establishments.

In department stores and in other retail shops it is necessary to acquire data pertinent to the details of each sales transaction. In large retail establishments it is the conventional practice for sales personnel to record sales transactions on multi-copy sales slips, one of which goes to the customer and another of which is supplied to the auditing department. The data on the slips is entered in the auditing department in suitable account books or in more mechanized departments it may be entered on punched cards for processing for electronic accounting devices.

Such auditing systems are inefficient, costly and have a high margin of error. Not only is there a possibility of error in filling out the sales slip, particularly in the case of inexperienced personnel, but there is a further possibility of error when converting information from the slip to other media for auditing purposes.

Attempts have been made to minimize error and to increase the efficiency of retail accounting operations by the use of pre-punched cards or tags attached to the merchandise and containing, in coded form, information with regard to style, price and other relevant data. The tags, after being removed from the merchandise, are scanned and processed by electronic data processors of standard design.

In addition to information contained on the pre-punched tag, it is also necessary to enter for each transaction so-called variable data, such as gift wrapping charges, C.O.D. costs and other special information which cannot be pre-punched. Thus the system must be adapted to acquire and audit both fixed and variable data. Systems heretofore used to handle both pre-punched tags and variable data have been complex in design and operation and so bulky as to occupy an inordinate amount of counter space. Moreover, such machines, despite their high costs, have not been reliable and trustworthy in operation.

In view of the foregoing, it is the principal object of the invention to provide a new and improved system for acquiring both fixed and variable data at the point of sale in retail establishments. While the system is of particular value in connection with recording the details of sales transactions, it will be evident that the invention is also applicable to many other phases of commercial accounting, such as the taking of inventory.

More specifically, it is an object of this invention to provide a novel scanner for translating pre-punched alpha-numeric coded data into output pulse form, the scanner acting in conjunction with a novel manual keyboard for translating variable data into output pulse form, the output pulses so produced controlling various data processing devices. An important feature of the invention resides in the photoelectric scanning of punched cards without physical contact therewith during readout operations. Another feature is a manual keyboard having an interlocking switch operation preventing accidental entry of data.

Also an object of the invention is to provide apparatus of the above-described type which is simple to operate and yet is reliable and highly efficient.

Another object of the invention is to provide a point-of-sale electronic auditing machine for recording fixed and variable data, the machine being sturdy and compact in design. A significant advantage of the machine is that it may be manufactured and sold at relatively low cost and thereby quickly repay its initial cost.

Briefly stated, these objects are attained in an electronic accounting system in which fixed data carried by pre-punched or marked cards are scanned serially in an electronic scanning device wherein a light source is caused to traverse the cards, the light source being moved concurrently with a bank of photocells which receives light passing through or reflected from the cards to produce a first series of pulses corresponding to the data contained thereon. Variable data is entered on a manual keyboard and converted into a second series of pulses, the first and second series of pulses yielded by the scanner and by the keyboard being fed successively into data processing equipment.

For a better understanding of the invention as well as further objects and features thereof, reference is made to the following detailed description to be read in conjunction with the accompanying drawings, wherein—

FIG. 2 shows schematically the various pre-punched tickets containing the fixed data to be entered into the systems.

FIG. 3 is a plan view showing a preferred embodiment of a scanner in accordance with the invention.

FIG. 4 is a sectional view taken in the plane indicated by line 4—4 in FIG. 3.

FIG. 5 is a schematic diagram of the scanner arrangement.

FIG. 6 is a perspective view of a keyboard in accordance with the invention.

FIG. 8 is a separate view of the light grating used in the scanner.

FIG. 9 is a magnified view taken within circle IX in FIG. 3.

Figure 1:
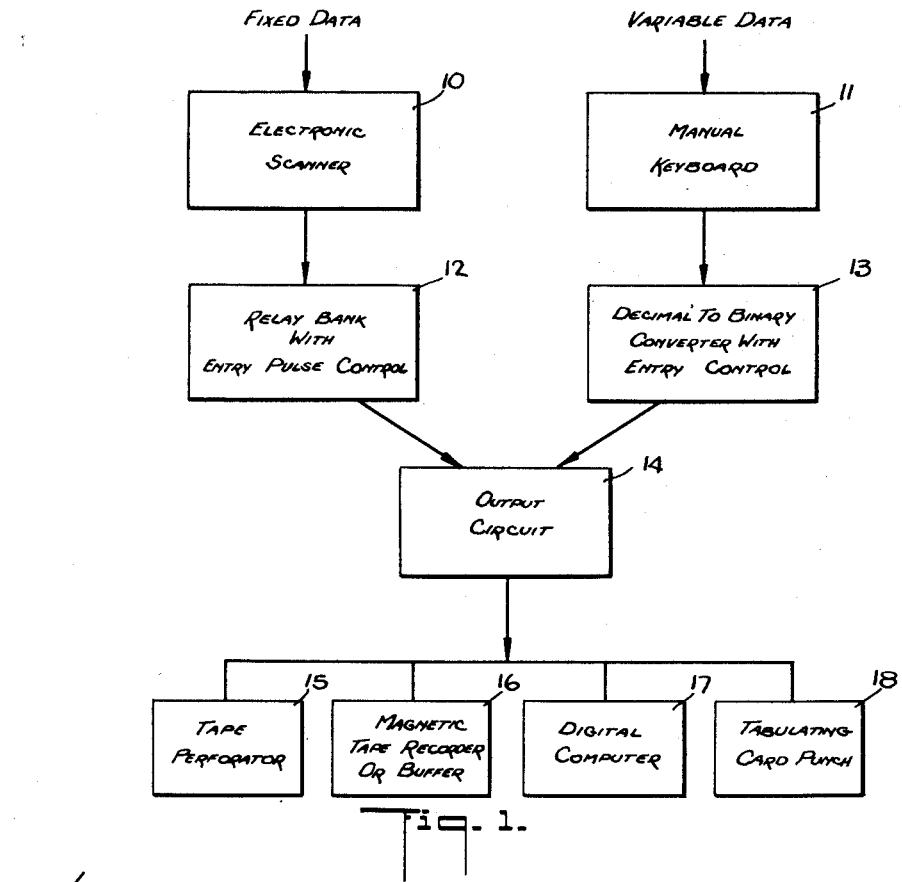
FIG. 1 is a block diagram of an auditing system in accordance with the invention.
Figure 7:
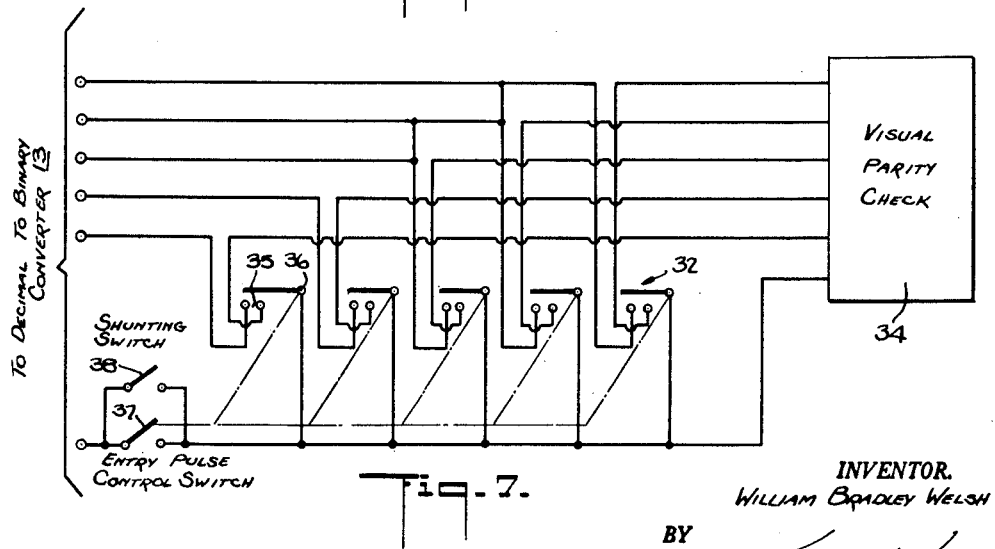
FIG. 7 is a circuit diagram of the keyboard arrangement.

Referring now to the drawings and more particularly to FIG. 1, the machine in accordance with the invention generally comprises an electronic scanner, designated by numeral 10, for detecting or reading fixed data carried on punched tickets or the like, a manual keyboard 11 upon which variable data pertinent to a sale or other transaction may be entered at the point of sale, a relay bank 12 or equivalent means for converting the scanner signals into suitable pulses in binary form and a decimal-to-binary converter 13 coupled to the keyboard 11 to translate decimal digits entered on the keyboard into binary pulses.

The pulses produced in the relay bank 12 and in the converter 13 are fed to an output circuit 14 from which they are conveyed to associated data processing equipment which may be of any existing type, making use for example of a tape perforator 15, a magnetic tape recorder 16, a memory device or a digital computer 17 or a tabulating card punch 18. It is to be understood that the associated equipment may be in any conventional form.

The pre-punched fixed data cards to be used with the scanner 10 may take the form of tickets or tags, such as those designated as A, B, C and D in FIG. 2, made of punched card stock, tag or bristol paper, or any plastic, metal or other material suitable for the purpose. The cards may be punched with any known alpha or numeric binary or decimal code in any number of channels and of any channel width. Existing punched media such as IBM, Remington-Rand Flexowriter cards may be used as well as Dennison or Kimball print-punch type of unit control merchandise tickets. The tickets are each provided with pin guide or positioning apertures $h_1$ and $h_2$ and with data punch holes $h_3$.

The classification of data which is pre-punched in numeric or alpha code into tickets A, B, C and D may come under the following typical headings:

*Ticket A (Master Data).*—This ticket will contain in properly coded form the identification of the store, the department therein, the register number and the date of the transaction. This pre-punched ticket is not attached to the merchandise and because it is dated it must be placed in position at the beginning of each day and replaced in whole or part whenever necessary. Each store department is provided with its own master data tickets.

*Ticket B (Unit Control Data).*—This ticket which may be in the form of a perforated card, one section of which is attached to the merchandise and the other of which is removable contains information as to style, color, vendor, season price, etc. This ticket is attached in the marking room to the merchandise before the item is placed on the floor. Markdowns are not punched on this ticket since such data is variable.

*Ticket C (Sales Clerk Number).*—If the store pays its sales personnel a sales commission, the clerk, in addition to inserting cards A and B into the scanner also places his own pre-punched ticket or token into the reader 10 prior to recording a transaction, this ticket containing the sales clerk's serial number.

*Ticket D (Customer's Credit Account Number.)*—If sales is on credit, the clerk places the customer's pre-punched "charge plate" on the reader. If the customer does not have his plate with him, then the charge account number must be entered manually on keyboard 11. This data is programmed last on the scanner since as a practical matter it will be found that more than half of a store's customers having a charge account will not at the time of a purchase have their charge plate or token available. Accounts receivable can therefore be electronically processed without delay or cost.

It is to be understood that the tickets described above are given merely by way of example, and that the nature of the ticket and the data contained thereon will depend upon the particular use to which the system is put.

The structure of the photoelectric scanner for reading the fixed data from the punched cards, such as A, B, C and D in FIG. 2, is shown separately in FIGS. 3 and 4. The scanner comprises a stationary frame 19 having an arcuate end platform 20 for supporting the cards or tickets to be scanned. The platform 20 is provided with an elongated window 21 to expose the punch holes in the cards supported thereover. The cards (A, B and C being shown) are secured temporarily to the platform by marginal locating pins which are received in apertures $h_1$ and $h_2$ or other clamping means adapted to receive the several cards in successive positions along the arcuate surface of the platform. In practice it is necessary to secure only one end of the card to the platform, the scanning device being provided with a shoe to press down the card on the arcuate surface in the course of scanning. This simplifies the attachment and detachment of the cards to the machine.

Pivotally mounted within the frame 19 is a swinging cradle 22, the cradle being supported within trunnions 23 and 24. A motor 25 attached to the outside of the frame and coupled to the cradle through shaft 26 acts to swing the cradle throughout a sector which in practice may be about 80°. The motor may be provided with a simple gear reduction mechanism to swing the cradle through a given arc, an extension spring serving to return the cradle to its starting point.

A bracket 27 is attached to the front end of cradle 22, the bracket extending through a slot 28 in platform 21 and being adapted to support a set of exciter lamps 29 on the exterior of frame 19 in spaced relation to platform 20. The position of the lamps 29 is such that as the cradle is swung, the lamps traverse an arcuate path in alignment with the cards supported on the platform, whereby the light rays from the lamps penetrate the holes punched on the cards.

Mounted in the front end of the cradle 22 is a projection lens 31 which collects the light flux passing through the punched holes in the cards and projects an image of holes onto a bank of photocells 30 mounted on the other end of the cradle. A single row of six photocells 30 is illustrated, one cell being provided to read out each channel as the frame swings on its mounting axis. The single row of cells sequentially reads out each successive column on the punched cards mounted on the platform 20.

Mounted on platform 20 underlying the cards thereon is a light grating G, as shown separately in FIG. 8 comprising an opaque film or plate having light permeable slits $g$ thereon which register with the columns on the cards. These slits, as best seen in FIG. 9 are relatively narrow as compared to the diameter of holes $h_3$ (i.e., .027″; .050″) and provide sharp pulses of light having a uniform width. In this way the pulses which are generated are uniform both in spacing and duration. The width of the slits on the grating G may be varied by means of an overlapping grating which is longitudinally adjustable relative to grating G.

Thus the punched cards representing the fixed data are mounted serially on a platform surface arced in one plane. The cards are stationary and scanning is accomplished by swinging a light source along an arc concentric with the platform arc to illuminate through grating G successive columns of punched data $h_3$ on the cards. The resultant light images are projected onto the photocells, each of which, as shown in FIG. 5, is associated with a relay in bank 12, such that if a punch exists at a given position, the associated photocell is activated to produce a voltage energizing the related relay to close a switch providing a pulse action.

It is also possible within the context of the invention to employ rectilinear motion rather than rotary motion, in which event the punched media will be mounted on a flat platform. But this construction is necessarily more complex and entails a relatively expensive bearing design for a reciprocating rectilinear mechanism.

Relay bank 12 in its simplest form may consist of one relay for each binary channel, or in a more complex form two or more relays in parallel form, each binary channel to ensure the emission of a pulse even though one of the parallel relays fails to actuate periodically.

An entry pulse control switch may be employed which can be photoelectric or electromechanical to control the duration of the pulse and the relative time position, within each readout cycle. If the entry pulse control is photoelectric, one or more other relays in parallel may be employed to complete the circuit at a time in the cycle when the binary channels in any one column are most likely to have actuated their relays positively. Rather than use additional entry pulse control relays, one may add double pole contacts to the existing relay bank.

An important practical advantage of the structure shown is that the photoelectric scanner does not physically engage the stationary cards during readout. Conventional readout mechanisms usually make use of sensing pins which must feel for a hole, or in the case of photoelectric scanners, the cards are mechanically fed into very close juxtaposition to a matrix of photocells. The present invention does not require extremely precise alignment of the fixed data media with the scanner, for the projection lens magnifies the light pattern of the holes to cover the area of the end of photocells completely.

Another advantage in the projection system incorporated in the scanner lies in the amplification of the light to dark ratio of the light flux passing through the punched hole to that passing through the translucent paper of the ticket. The projection system makes it possible to employ relatively inexpensive photocells which drive the relays. In practice, a single transistor amplifier stage may be used with each photocell.

The scanner may also be adapted to photoelectrically scan and analyze control media which is not punched but is printed or marked by some other method which produces a distinct difference of light reflectivity at given index points to cause a sufficient current differential in the photocell circuit to create an output pulse. In its simplest form, the scaning device will consist of an incident light beam directed to impinge on the marked card at an angle of 45° or less, the reflected light being picked up by a photosensitive device responsive to its intensity. Another form may employ the old "magic lantern" principle of projected light reflected off the control media upon one or more photocells.

The manual keyboard 11, as shown separately in FIG. 6, is preferably constituted by two banks of flat keys 32 and 33, the keys being pivoted on a fulcrum in a manner similar to the white keys of a piano or organ, each key representing a decimal digit. Each bank is mounted on their respective frames a few inches apart for convenient operation by both right and left hands. By mounting the two sets of five keys in a horizontal parallel row, the operator is able to place all ten fingers over the ten keys in a fashion similar to that of playing a piano, with the exception that the same finger remains in position over the same key at all times and the wrist is not required to move at any time.

Thus an operator can place the left and right hands over their respective five key banks and enter function codes and their corresponding decimal data in its entirety without moving wrist or fingers to any other control buttons, switches or bars. The arrangement is such that when the operator touches a key lightly, a double pole switch is closed and the corresponding decimal digit is projected on a visual checking screen 34, but the binary bits are not punched until the key is depressed a little harder to close a bank master switch which enters the code pulse.

As shown for the bank of keys 32 in FIG. 1, each key when depressed lightly, actuates double pole switch 35. The keys 32 are pivotally mounted on a rocker frame 36 such that when the key is pressed somewhat harder, a bank master or entry pulse control switch 37 is closed. The double pole switches 35 for the several keys in the bank are connected through one pole directly to the visual parity check device 34 which may be any commercially available device adapted to project decimal numbers in response to appropriate switching actions. Thus, when the key is depressed lightly, the related number is displayed.

The switches 35 are each connected through the other pole in series with the entry pulse switch 37 to the decimal to binary converter 13 which translates the decimal numbers as selected by the switches into binary pulses. Many devices for this purpose are commercially available and are described in the literature. In order for the converter to be actuated, it is necessary that both given switch 35 and the master switch 37 be closed. This can be effected only by relatively hard pressure on the key. A shunting switch 38 is provided across switch 37 if the operator wishes to cancel out the anti-error safety feature to make entries on the first light touch of the key, without interlock of the master switch.

In lieu of two parallel banks of keys, in a single horizontal row, one may dispose the two banks in two parallel horizontal rows, one being a few inches higher than the other for single hand operation, similar to that of a two manual organ arrangement. This makes possible single hand operation, leaving the other hand free to flip over a series of cards, bills or checks. Alternatively the two banks of keys may be positioned in a single plane, one behind the other. It is also posisble to use a single bank of keys in conjunction with a shift bar to cause the keys to operate in an odd or even number series, a zero key also being provided.

These novel keyboards may be operated at highest possible speed and yet reduce operator fatigue to a minimum and afford a very low cost construction. They are also applicable to adding machines, calculating machines and any and all digital input devices.

In summary, therefore, the operation of the system is as follows: The operator in making and recording a sale, inserts the various tickets representing fixed data into the scanner 10. He presses a motor switch for the scanner and the tickets are scanned and read off into the data processing machine. Upon completion of scanning, he enters the variable data into the manual keyboard 11 to supply the additional information into the data processing machine. This completes the transaction.

The manual keyboard and the scanner may be combined into a rugged and compact machine occupying a minimum of counter space. Both devices are of simple straightforward design and may be manufactured at relatively low cost.

While there has been shown what are considered to be preferred embodiments of the invention, it will be understood that many changes and modifications may be made therein without departing from the essential spirit of the invention as defined in the accompanying claims.

What is claimed is:

1. In an accounting machine, a scanner for pre-punched coded cards and the like, comprising an arcuate platform for supporting said cards serially in a common scanning plane, said platform having a window exposing the punches in said cards, and a reciprocating cradle movable back and forth across said platform and including a light source for directing light onto the front face of said cards, the light penetrating only the punches therein and photoelectric means on said cradle adjacent the opposing face of said cards for intercepting light passing therethrough.

2. A scanner mechanism for pre-punched coded cards and the like, said mechanism comprising a fixed frame having an arcuate platform for supporting a series of said cards in an arcuate plane, a cradle pivotally mounted within said frame, motor means to rock said cradle within a sector corresponding to the arc of said platform, a light source exterior to said frame and attached to one end of said cradle sequentially to illuminate said cards as the cradle is rocked within said sector, and photoelectric means secured to said cradle within said frame to intercept light passing through said cards as said cradle is rocked.

3. A scanner mechanism for pre-punched coded cards and the like, said mechanism comprising a fixed frame having an arcuate platform for supporting a series of said cards in an arcuate plane, a cradle pivotally mounted within said frame, motor means to rock said cradle within a sector corresponding to the arc of said platform, a light source exterior to said frame and attached to one end of said cradle sequentially to illuminate said cards as the cradle is rocked within said sector, a projection lens attached to the said one end of said cradle within said frame to collect and project light passing through said cards, and a bank of photoelectric cells secured to the other end of said cradle to intercept the light from said projection lens.

4. In an accounting machine as set forth in claim 1, wherein a light grating is interposed between said cards and said platform, said grating having parallel light permeable slits therein to confine the light passing through said punches, thereby to produce pulses of uniform duration and spacing.

5. A structure as set forth in claim 4 further including an overlapping grating longitudinally adjustable with respect to the main grating to vary the width of the slits therein.

(References on following page)

References Cited in the file of this patent

UNITED STATES PATENTS

| | | |
|---|---|---|
| 1,721,398 | Jacob | July 16, 1929 |
| 2,860,325 | Welsh et al. | Nov. 11, 1958 |
| 2,948,889 | Kuehl | Aug. 9, 1960 |
| 2,987,249 | Van Vechten | June 6, 1961 |
| 2,988,271 | John et al. | June 13, 1961 |
| 2,994,476 | Sinn | Aug. 1, 1961 |
| 2,996,245 | Wittenmyer | Aug. 15, 1961 |
| 3,000,555 | Innes | Sept. 19, 1961 |
| 3,011,703 | Rand | Dec. 5, 1961 |

OTHER REFERENCES

"Univac II Data Automation System," Remington Rand, 1957.

Trends in Computers: Automatic Control and Data Processing, April 1954, published by American Institute of Electrical Engineers, particularly pages 79, 94, 104, and 190.